United States Patent [19]

Shimizu et al.

[11] 4,202,763

[45] May 13, 1980

[54] HIGH-EFFICIENT ACTIVATED SLUDGE METHOD

[75] Inventors: Norio Shimizu; Youji Odawara, both of Hitachi, Japan

[73] Assignee: Hitachi, Ltd., Japan

[21] Appl. No.: 655,218

[22] Filed: Feb. 4, 1976

[30] Foreign Application Priority Data

Feb. 7, 1975 [JP] Japan .................................. 50-15398
Jun. 20, 1975 [JP] Japan .................................. 50-74432

[51] Int. Cl.² .............................................. C02C 1/06
[52] U.S. Cl. ........................................ 210/14; 210/15
[58] Field of Search ................................ 210/2–9, 210/11, 14, 15, 17, 63 R

[56] References Cited

U.S. PATENT DOCUMENTS

| | | | |
|---|---|---|---|
| 3,574,331 | 4/1971 | Kurosawa | 210/15 |
| 3,725,258 | 4/1973 | Spector et al. | 210/15 |
| 3,764,523 | 10/1973 | Stankewich | 210/15 |
| 3,764,524 | 10/1973 | Stankewich | 210/15 |
| 3,770,128 | 11/1973 | Kast | 210/169 |
| 3,872,003 | 3/1975 | Walker | 210/15 |
| 3,910,838 | 10/1975 | Kaelin | 210/15 |

FOREIGN PATENT DOCUMENTS

2308853 9/1974 Fed. Rep. of Germany .

OTHER PUBLICATIONS

Cherhkuri et al., "Design Consideration of Oxygen Activated Sludge Systems," *Applic. of Comm. O₂ to Water & Waste Water Systems*, 1973.
Schmit et al., "Oxygen Efficiency in Deep Tanks," JWPCF, Nov. 1975, pp. 2586–2598.
Urza et al., "Aeration In A. 55-Foot Bubble Column," *I/EC Process Design & Development*, Jul. 1974, pp. 8–11.
"Zosui Gizitsu", *Journal of Water Use Technology*, vol. 2, No. 1, 1976.

*Primary Examiner*—Charles N. Hart
*Assistant Examiner*—Peter A. Hruskoci
*Attorney, Agent, or Firm*—Craig and Antonelli

[57] ABSTRACT

Waste water containing organic materials is introduced into an aeration tank, and is subjected to aeration treatment in the presence of activated sludge, while supplying oxygen to the aeration tank. The organic materials contained in the waste water are oxidized by high-efficient activated sludge at a high oxygen transfer rate of 5 to 80 mmol $O_2$/l·hr to the aeration tank.

14 Claims, 5 Drawing Figures

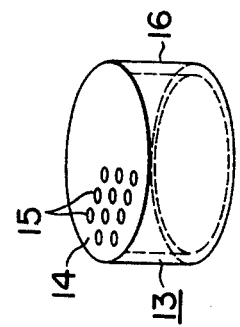
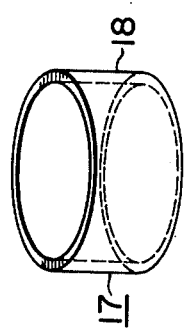
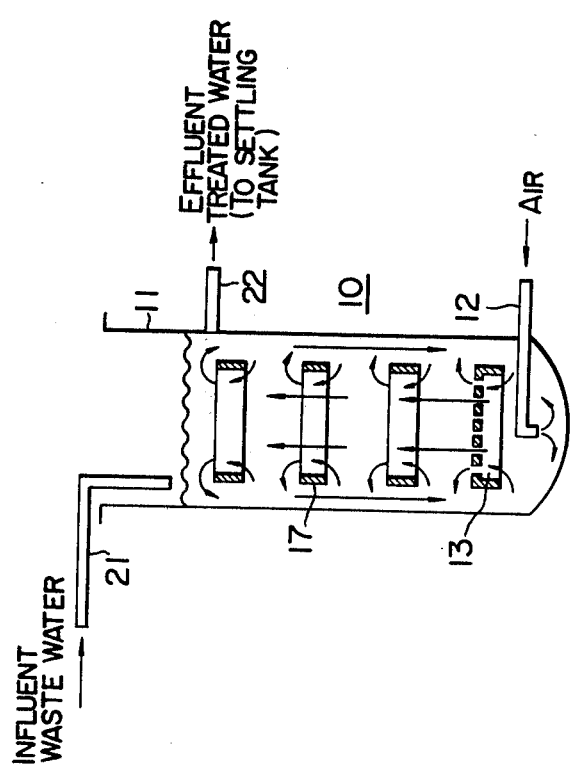

HIGH-EFFICIENT ACTIVATED SLUDGE METHOD

This invention relates to a method for aerating waste water containing organic materials, and more particularly to a method for aerating waste water containing organic materials using a deep aeration tank.

A kind of microbiological treatment, the so called activated sludge treatment, has been so far applied to the treatment of waste water containing organic materials, and it is said that the microbiological treatment is an almost established technique. However, the microbiological treatment has various disadvantages due to the limit of actions of microorganisms.

Heretofore, the public has not had serious concerns with the waste water treatment, and these disadvantages of the prior technique have not impaired the object of the waste water treatment. However, the environmental pollution control have recently become a keen concern to the public, and the social demand can hardly be satisfied so long as the disadvantages of the prior technique are not overcome.

According to the conventional standard method using activated sludge, a tank of so called pool pond type having a liquid depth of 4 to 5 m is used, where a large number of air diffuser are provided at the tank bottom to diffuse air into the tank, and a liquid in the tank is mixed and stirred by air bubble streams and at the same time oxygen required for microorganisms (activated sludge) is dissolved into the liquid. Besides said standard method, there are available other methods, for example, a step aeration method, a complete mixing method, a contact stabilization method, etc. Disadvantages common to these methods are given below:

(1) Low percent oxygen utilization
(2) Low reaction rate
(3) Difficulty in high load aeration treatment
(4) larger area for the aeration tank
(5) Liability to clogging of air diffuser, etc.

A method using an aeration tank of deep depth aeration type has been proposed to improve these disadvantages. The method has such advantages as high oxygen utilization rate (smaller amount of the air to be diffused) and smaller area for the aeration tank. Since the amount of the air to be diffused is very small, for example ⅓ to 1/5 of that required for said standard method, a complete mixing of air bubbles becomes difficult. Furthermore, since an oxygen transfer rate (which will be hereinafter referred to as "OTR") of the method is almost equal to that of the pool pond type method, the reaction rate becomes low. Furthermore, since the stirring of a liquid is gentle, scales are liable to be deposited on every part in the tank. That is, a probability of clogging the air diffuser is disadvantageously higher.

An object of the present invention is to provide a high-efficient activated sludge method, which assures a high load treatment of waste water containing organic materials.

Another object of the present invention is to provide a high-efficient activated sludge method capable of lowering a biochemical oxygen demand (which will be hereinafter referred to as "BOD").

Other object of the present invention is to elevate a reaction rate and make an area for an aeration tank smaller in the treatment of waste water containing organic materials.

To attain these objects, the present invention provides an aeration method for aerating waste water containing organic materials by introducing the waste water to a deep aeration tank and effecting an aeration treatment, while supplying oxygen to the tank, characterized by the aeration on the high OTR value to a liquid in the tank.

The current activated sludge method is based on a mixed system of bacteria and protozoa, where bacteria in activated sludge digest dissolved organic materials in waste water in an aeration tank and are grown, and protozoa (such as Vorticella, Epistylis, Opercularia, Carchesium, Paramoecium, and Colpidium) prey upon the propagated bacteria. Generation time of bacteria is as short as 20 to 120 minutes, whereas that of protozoa is, for example, as long as 10 hours in the case of Paramoecium. An oxygen utilization rate is so low that a rate of air to be diffused into an aeration tank is low, and an estimated OTR value is about 1 mmol $O_2$/l hr at most. Thus, the treating rate is low, and a treatment of waste water containing organic materials at a high concentration is difficult. That is, it is impossible to carry out a high load treatment of waste water according to the current activated sludge method.

The present inventors conceived that it was preferable to use activated sludges consisting mainly of bacteria having a short generation time, that is, a high growth rate, and carried out waste water treatments by increasing an OTR value to a liquid in an aeration tank, acclimating activated sludge, and particularly utilizing a floc consisting mainly of bacteria. That is, according to the present invention, a high-efficient activated sludge treatment of waste water containing organic materials is carried out by introducing the waste water into an aeration tank, and effecting aeration treatment of the waste water by supplying oxygen (which may be in the form of air) to the tank in the presence of activated sludge, where the oxidation of the organic materials is carried out at an oxygen transfer rate of 5 to 80 mmol $O_2$/l·hr to the tank, and especially a floc consisting mainly of bacteria is formed at an oxygen transfer rate of at least 10 mmol $O_2$/l·hr.

The present invention will be described, referring to the accompanying drawings.

FIG. 1 is a schematic vertical cross-sectional view of an apparatus embodying one example of the present method for aeration.

FIG. 2 is a schematic view showing one embodiment of an air diffuser device (perforated plate) to be used in the present invention;

FIG. 3 is a schematic view showing one embodiment of inside cylinder to be used in the present invention;

Figure 4:
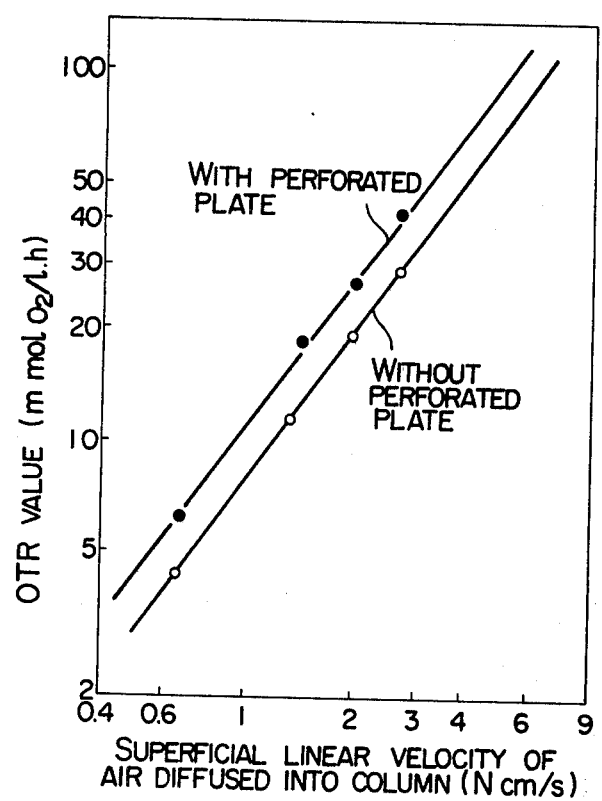
FIG. 4 is a graph showing relations between superficial linear velocity of air diffused into column and OTR values.

Results obtained when waste water treatments were carried out by microorganisms (protozoa and bacteria) in the presence of activated sludge are given below.

| OTR value (mmol O$_2$ /l . hr) | State of activated sludge | Floc settling ability | BOD volumic load kg /m$^3$ . d) | BOD removal (%) |
| --- | --- | --- | --- | --- |
| 1 | More protozoa | Good | 1 | 92 |
| 5 | More protozoa | Good | 2.5 | 90 |
| 10 | Less protozoa and more bacteria floc | Good | 4.0 | 91 |
| 20 | Scarcely any protozoa, and mostly bacteria floc | Good | 6.8 | 92 |
| 30 | Scarcely any protozoa, and mostly bacteria floc | Good | 9.8 | 90 |
| 70 | Scarcely any protozoa, and mostly bacteria floc | Good | 12 | 90 |
| 80 | Scarcely any protozoa, and mostly bacteria floc | Good | 13 | 90 |
| 100 | Scarcely any protozoa, and mostly bacteria floc | Poor | 13.5 | 85 |

According to the current OTR value of 1 mmol O$_2$/l·hr, the BOD volumic load is up to 1 kg/m$^3$·d, where much more protozoa are used. To increase the OTR value to 5 mmol O$_2$/l·hr, the BOD volumic load is elevated, but there are considerably more protozoa. When the OTR value is increased to 10 mmol O$_2$/l·hr, the proportion of protozoa is decreased, whereas the proportion of bacteria floc is increased. Thus, the BOD volumic load up to 4.0 kg/m$^3$·d is made possible, and a high load treatment and high rate treatment can be attained. When the OTR value is much more increased, the BOD volumic load can be increased correspondingly.

Heretofore it has been deemed that, when the OTR value is increased, that is, when a rate of air to be diffused is increased, the activated sludge floc would be dispersed. However, it has been found that when the OTR value is increased, the activated sludges are formed mainly into bacteria flocs, and can have a good settling ability without any dispersion of the flocs.

However, when the OTR value is increased to 100 mmol O$_2$/l·hr, no bacteria flocs having a high specific gravity are formed owing to vigorous stirring of the liquid, making the waste water treatment difficult. Furthermore, a large amount of air is required, and a running cost is greatly increased, making the method practically unsuitable. According to the test, the method is still practical when the OTR value is 80 mmol O$_2$/l·hr.

By increasing the OTR value, the activated sludges are formed into flocs mainly of bacteria, and a high load treatment and a high speed treatment are possible. According to the test, a preferable range for the OTR value is 10 to 65 mmol O$_2$/l·hr, and more practical range is 25 to 65 mmol O$_2$/l·hr.

The bacteria to be used in the method slightly depend upon kind of waste water containing organic materials, but are a mixed floc of at least one of the genera Zoogloea, Bacillus, Escherichia, Pseudomonas, Alcaligenes, Paracolobacterium, Nocardia, Flavobacterium, Achromobacter, Aerobacter, Bacterium, Corynebacterium, Microbacterium, Nitrosomones, Nitrobacter, Azotobacter, etc.

According to the present invention, the following apparatus is practically used to keep said range for OTR values economically more easy, make the area for the aeration tank smaller, and prevent the clogging of the air diffusion pipes. That is, an apparatus for high-efficient activated sludge treatment, in which waste water containing organic materials is introduced into a deep aeration tank and aeration treatment of the waste water is carried out while supplying oxygen to the tank, is provided, the aeration tank comprising an aeration tank body consisting of a cylindrical vessel, oxygen-diffusing and air-dispersing means provided in and at the bottom of the aeration tank body, at least one inside cylinder or an air dispersion device having a cylindrical skirt extended downwardly at the bottom of the device, which can be arranged in plurality in series at distances above the air-dispersing means, said inside cylinder or the air dispersion device being so arranged as to form a partial circulating streams flowing along both outside and inside of the inner cylinder or the skirt of the air dispersion device and an overall circulating stream ascending along the center part of the inside cylinder or the skirt of the air dispersion device, and descending along the outside of the inside cylinder or the skirt of the air dispersion device.

According to the present invention, a combined structure of an oxygen (or air) diffuser, which will be hereinafter referred to as an air diffusion pipe, and an air dispersion disk provided above the air diffusion pipe can be employed as the oxygen-diffusing and air-dispersing means provided in and at the bottom of the aeration tank, but the air diffusion pipe and the air dispersion disk can be integrated together. It is desirable that nozzle on the air diffusion pipe be arranged so that air or oxygen may be injected toward the bottom of the aeration tank. At least one inside cylinder or air dispersion device having a cylindrical skirt extended downwardly at the bottom of the device is provided. As the inside cylinder or the air dispersion device, a plurality of only the inside cylinders can be arranged stagewise, as shown in FIG. 1, or a plurality of the air dispersion devices can be arranged at every second or third stage between the inside cylinders, or a plurality of only the air dispersion devices can be arranged throughout the tank. Selection of the arrangement can be appropriately made in view of the properties of waste water to be treated, etc.

The inside cylinders or air dispersion devices are arranged in series in the tank so as to form partial circulating streams flowing along the inside and outside of the individual inside cylinder or the skirt of the air dispersion device, and an overall circulating stream ascending along the center parts of the inside cylinders or skirts of the air dispersion devices, and descending along the outsides of the inside cylinders or skirts of the air dispersion devices.

Now, the present invention will be described in detail, referring to the drawings.

In FIG. 1, waste water inlet pipe 21 is provided at the top of aeration tank body 11, and an effluent outlet pipe 22 is provided at a level just below the waste water inlet pipe. Air diffusion pipe 12 is provided at the bottom of the tank body, and air dispersion device 13 is provided above the pipe as an air-diffusing and dispersing means. Air dispersion device 13 is comprised of a perforated plate 14 having relatively large perforations 15 and a cylindrical skirt 16 extended downwardly at the bottom of the perforated plate. Air dispersion device 13 acts to make the air diffused from air diffusion pipe 12 finer. A plurality of inside cylinders 17 are provided stagewise at definite distances from each other above air dispersion device 13, and act to perform good mixing and circulation of the liquid in the tank. Inside cylinder 17 is comprised mainly of skirt 10. Perforation size of the perforated plate constituting the air dispersion device is 5 to 30 mm in diameter, preferably 10 to 15 mm in diameter, and a perforation ratio of the perforated plate is at least 20%. Length of cylindrical skirt 16 of air dispersion device 13 is ½ of the diameter of the perforated plate as the standard, but a range of ¼ to ⅔ of the diameter of the perforated plate can be sufficient in the present invention. Length of inside cylinders 17 provided in plurality stagewise above the air dispersion device is likewise given. Respective diameters of the air dispersion device and inside cylinder are such that the cross-sectional area (area of perforated plate) of the device or inside cylinder may be in a range of 50 to 80%, preferably about 50%, of the cross-sectional area of the aeration tank body. Appropriate distance between the air dispersion device and inside cylinders, or the inside cylinders is approximately equal to the diameter of the inside cylinder or air dispersion device.

In the aeration tank as described above, air injected from air diffusion pipe 12 impinges against air dispersion device 13, and ascends through the tank, while being dispersed into fine air bubbles. The ascending air bubbles pass along the insides of inside cylinders 17 provided above the air dispersion device toward the liquid surface. At the same time, the liquid ascends together with the ascending air bubbles, turns to the outsides of the inside cylinders at the level of liquid surface, and descends through an annular channel between the inside cylinders and the tank body, thereby generating an overall circulating flow of the liquid. On the other hand, a portion of the descending liquid stream passing through the annular channel is sucked inwardly by the ascending liquid stream passing along the insides of the inside cylinders at free spaces between the inside cylinders, and flows into between the inside cylinders. At the same time, a portion of the liquid and air bubbles also flows outwardly into the annular channel from the inside between the inside cylinders. Thus, partial circulating streams are generated around the individual inside cylinders. That is, an overall circulating stream and partial circulating streams are generated in the aeration tank, as indicated by arrow marks in FIG. 1, and consequently a good air-liquid contacting can be obtained, and high OTR values can be obtained, as compared with the cases using no perforated plate and inside cylinders, as shown in FIG. 4.

Since the present aeration tank can readily provide high OTR values, and thus the growth rate of activated sludge becomes higher. That is, the reaction rate is accelerated and a high speed treatment is made possible to effect.

When waste water containing organic materials is treated, using said aeration tank, and if a BOD concentration of influent waste water is so low that a BOD concentration of treated water at 90% removal is within a range of effluent control limit value, the treated water can be discharged only by carrying out solid-liquid separation after the primary aeration treatment. However, in the case of high BOD concentration, the BOD value of the treated water is still, for example, 100 to 300 ppm even if more that 90% removal can be attained, and thus the treated water cannot be discharged as effuent as such. Than is, a secondary aeration treatment is required. In that case, the treated waste water can be further treated according to the conventional method, or using the present aeration tank of perforated plate type as the secondary treatment.

Figure 5:
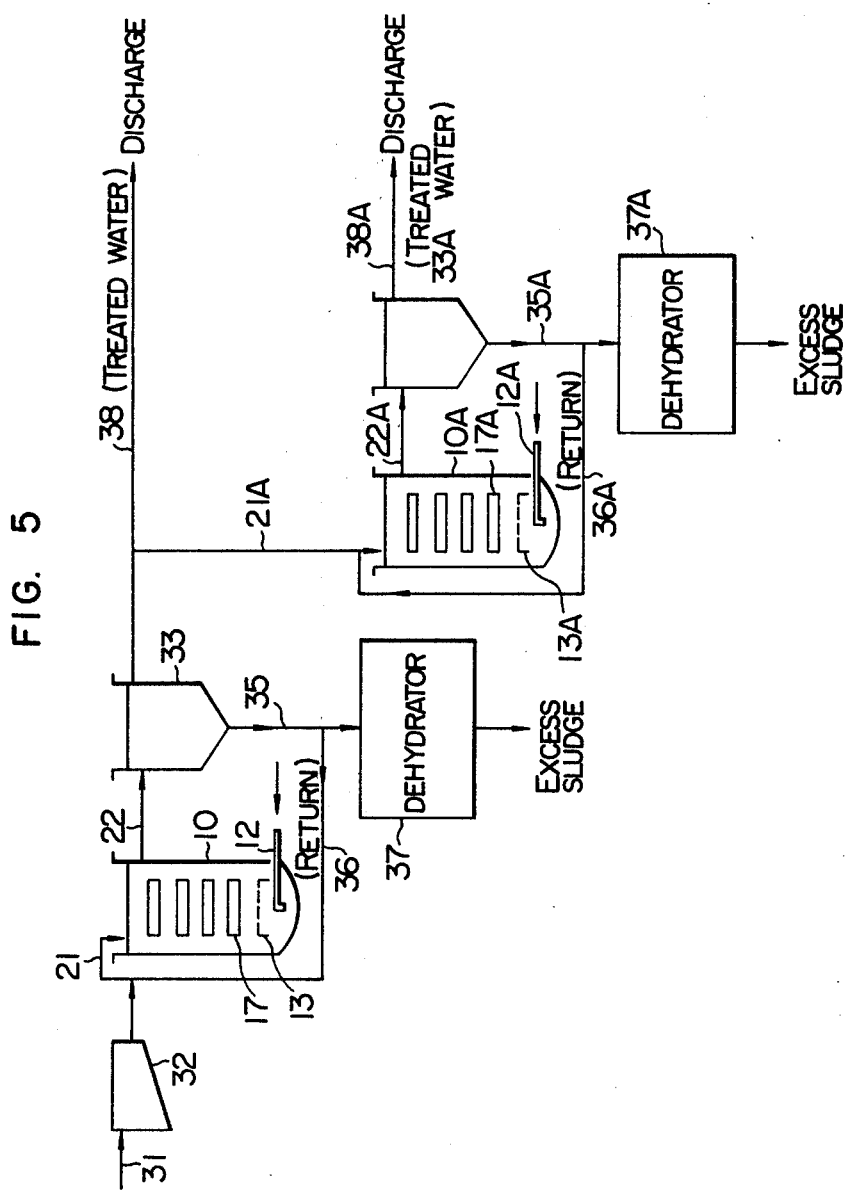
FIG. 5 is a flow diagram showing one embodiment of a system for treating waste water, whereby an aeration tank of the present invention is incorporated.

In FIG. 5, one embodiment of a high-efficient system for treating waste water containing organic materials, wherein an aeration tank of the present invention is incorporated, is illustrated. Influent waste water flows into settling tank 32 through conduit 31 at first, and subjected to preliminary treatment therein. Then, the waste water is led to deep aeration tank 10 of perforated plate type of the present invention, and subjected to aeration treatment. Return sludge from settling tank 33 is led to the aeration tank together with the treated waste water through conduits 35 and 36. Treated waste water is led to settling tank 33, and the formed precipitates are separated by settling, and then the treated water is discharged as effluent through conduit 38. The precipitates (settled flocs) are passed through dehydrator 37, and then recovered as excess sludges. When the BOD concentration of the treated water is outside control limit value, the treated water is further treated by passing it through another deep aeration tank 10A, and then discharged as effluent. The construction of the secondary aeration system is the same as that of the primary aeration system using aeration tank 10, and suffix "A" is added to the numeral of the aeration tank of primary aeration system, without making detailed explanation again. Other members of the secondary aeration system are the same as those of the primary aeration system, and suffix "A" is likewise added to numeral of the identical members of the primary aeration system without making detailed explanation again.

The present invention will be described in detail, referring to Examples.

EXAMPLE 1

Food industry waste water having a BOD concentration of 2,000 ppm was led to an aeration tank of perforated plate type, having a height of 3.5 m, a diameter of 0.5 m, and a liquid charge capacity of 300 l, in which one air dispersion device, two inside cylinders, one air dispersion device, two inside cylinders, one air dispersion device and two inside cylinders were provided from the bottom upwardly in that order, and treated with activated sludge at a mean liquid temperature of 25° C., an OTR value of 30 mmol $O_2$/l·hr, and a BOD volumic load of 9.8 kg/m$^3$·d for an aeration time of 3.5 hours, whereby BOD concentration of the treated water was reduced to 195 ppm. The treated water was further treated in another aeration tank of the same type as above at a BOD volumic load of 1.0 kg/m$^3$·d, and an OTR value of 1 mmol $O_2$/l·hr, for an aeration time of 3.3 hours, whereby treated water having a BOD concentration of 17.5 ppm was obtained.

EXAMPLE 2

Food industry waste water having a BOD concentration of 500 ppm was led to a deep aeration tank having a height of 10 m, a diameter of 0.3 m and a liquid charge capacity of 680 l, in which five perforated plates were provided at equal distances, and treated therein with activated sludge at a mean liquid temperature of 25° C, an OTR value of 10 mmol $O_2$/l·hr, and a BOD volumic load of 4 kg/m$^3$·d for an aeration time of two hours, whereby treated water having a BOD concentration of 45 ppm was obtained.

EXAMPLE 3

Food industry waste water having a BOD concentration of 1,200 ppm was treated with activated sludge at an OTR value of 20 mmol $O_2$/l·hr and a BOD volumic load of 6.8 kg/m³·d for an aeration time of 3 hours, using the same apparatus as in Example 2, whereby treated water having a BOD concentration of 96 ppm was obtained.

EXAMPLE 4

Town waste water having a BOD concentration of 300 ppm was treated with activated sludge at an OTR value of 5 mmol O₂/l·hr and a BOD volumic load of 2.5 kg/m³·d for an aeration time of 2 hours, using the same apparatus as in Example 1, whereby treated waste water having a BOD concentration of 30 ppm was obtained.

EXAMPLE 5

Food industry waste water having a BOD concentration of 3,000 ppm was treated with activated sludge at an OTR value of 80 mmol O₂/l·hr and a BOD volumic load of 13.0 kg/m³·d for an aeration time of 4.0 hours, using the same apparatus as in Example 1, whereby treated water having a BOD concentration of 300 ppm was obtained.

EXAMPLE 6

Food industry waste water having a BOD concentration of 3,000 ppm was treated with activated sludge at an OTR value of 100 mmol O₂/l·hr and a BOD volumic load of 13.5 kg/m³·d for an aeration time of 4 hours, using the same apparatus as in Example 1, whereby waste water having a BOD concentration of 450 ppm was obtained. However, the settling ability of the activated sludge used was poor and the treated waste water was contaminated with fine flocs.

As described above, oxygen utilization rate or reaction rate is increased in the present invention, and even if a BOD volumic load of waste water is increased, a sufficient treatment can be made. Thus, waste water containing organic materials can be treated with a high efficiency, and the necessary apparatus for aeration treatment can be made more compact, and also the area necessary for the aeration tank can be reduced. These significant effects can be attained in the present invention.

What is claimed is:

1. A method for high-efficient microbiological oxidation treatment of waste water containing organic materials, wherein the waste water is introduced into an aeration tank and is subjected to aeration treatment in the presence of activated sludge while supplying oxygen to the tank, which comprises forming flocs consisting mainly of bacteria and oxidizing the organic materials at an oxygen transfer rate of 10 to 80 mmol O₂/l·hr to the aeration tank and separating said flocs from said waste after the oxidation of said organic material.

2. A method according to claim 1, wherein the oxygen transfer rate is not more than 65 mmol O₂/l·hr.

3. A method according to claim 1, wherein the oxidation is carried out at an oxygen transfer rate of 20 mmol O₂/l·hr.

4. A method according to claim 1, wherein the oxidation is carried out at an oxygen transfer rate of 20 to 65 mmol O₂/l·hr.

5. A method according to claim 1, wherein flocs of at least one of genera Zoogloea, Bacillus, Escherichia, Pseudomonas, Alcaligenes, Paracolobacterium, Nocardia, Flavobacterium, Achromobacter, Aerobacter, Bacterium, Corynebacterium, Microbacterium, Nitrosomones, Nitrobacter and Azobacter are formed.

6. A method according to claim 1, wherein the waste water is introduced as influent into the upper portion of a deep aeration tank having a depth substantially greater than the exposed surface area of the liquid level of waste water within said tank and an oxygen-containing gas is introduced into said tank below the level of said waste water.

7. A method according to claim 6, wherein waste water is treated in said aeration tank by forming a series of circulating streams vertically spaced from each other within said aeration tank.

8. A method according to claim 7, wherein the aeration treatment of said waste water is effected by supplying oxygen to a lower portion of said tank via an oxygen diffusion pipe which causes the oxygen to diffuse across the lower portion of the tank prior to passing upward through waste water contained within said tank.

9. The method according to claim 8, wherein said waste water is introduced into said tank above a liquid level of the waste water in said tank and is caused to circulate from said level to a bottom portion of said tank, said tank being a deep vertical tank with a depth greater than the horizontal cross-sectional area.

10. A method for high-efficient microbiological oxidation treatment of waste water containing organic materials, wherein the waste water is introduced into an aeration tank and is subjected to aeration treatment in the presence of activated sludge while supplying oxygen to the tank, which comprises treating the waste water in the presence of said activated sludge at an oxygen transfer rate of 10 to 80 mmol O₂/l·hr to the aeration tank thereby oxidizing the organic material and forming flocs consisting mainly of bacteria, separating the flocs formed from the treated water in the presence of said activated sludge, aerating the treated water in another aeration tank, and separating the flocs formed from the treated water in said another aeration tank.

11. A method according to claim 10, wherein aeration of the treated water in said another aeration tank is carried out at an oxygen transfer rate of 5 to 80 mmol O₂/l·hr.

12. A method according to claim 10, wherein said aeration tank is a deep tank having a depth much greater than the horizontal cross-sectional area of the tank.

13. A method according to claim 10, wherein flocs of at least one of genera Zoogloea, Bacillus, Escherichia, Pseudomonas, Alcaligenes, Paracolobacterium, Nocardia, Flavobacterium, Achromobacter, Aerobacter, Bacterium, Corynebacterium, Microbacterium, Nitrosomones, Nitrobacter and Azobacter are formed.

14. A method for high efficient microbiological oxidation treatment of waste water containing organic materials, wherein the waste water is introduced into an aeration tank and is subjected to aeration treatment in the presence of activated sludge while supplying oxygen to the tank, which comprises forming flocs consisting mainly of bacteria and oxidizing the organic materials at an oxygen transfer rate of 10 to 80 mmol O₂/l·hr to the aeration tank and separating said flocs from said waste water after the oxidation of said organic material, wherein the waste water is introduced as influent into the upper portion of a deep aeration tank having a depth substantially greater than the exposed surface area of the liquid level of waste water within said tank, wherein said aeration tank is a vertical cylindrical tank having an inner wall surface, and an oxygen-containing gas is introduced into said tank below the level of said waste water, and wherein said waste water is treated in said aeration tank by forming a series of circulating streams vertically spaced from each other within said aeration tank, with the circulating streams being formed within said aeration tank by a plurality of vertically spaced cylinders positioned within said tank and spaced from said wall surface to provide annular spaces through which the waste water descends to the bottom of the tank and cylindrical openings through which the waste water ascends to the top of the tank, and the treated waste water is removed as effluent from the top of said tank below said liquid level.

* * * * *